United States Patent [19]

Miyata et al.

[11] 3,991,656
[45] Nov. 16, 1976

[54] SERVO VALVE DEVICE IN POWER STEERING APPARATUS

[75] Inventors: Toshimasa Miyata, Chiryu; Kenji Takahashi, Kariya, both of Japan

[73] Assignee: Toyoda Koki Kabushiki Kaisha, Japan

[22] Filed: May 30, 1975

[21] Appl. No.: 582,459

[30] Foreign Application Priority Data
June 6, 1974 Japan.............................. 49-64714
June 6, 1974 Japan.............................. 49-64713

[52] U.S. Cl.............................. 91/372; 91/375 A; 180/147
[51] Int. Cl.²........................................... F15B 9/10
[58] Field of Search.................. 180/79.2 R, 79.2 D, 180/146, 147; 91/375 A, 370, 371, 372, 373, 368; 137/625, 21; 60/380

[56] References Cited
UNITED STATES PATENTS

| | | | |
|---|---|---|---|
| 3,657,967 | 4/1972 | Suzuki | 91/372 |
| 3,817,151 | 6/1972 | Kawabata | 91/375 X |

*Primary Examiner*—Robert R. Song
*Assistant Examiner*—John A. Pekar
*Attorney, Agent, or Firm*—Oblon, Fisher, Spivak, McClelland & Maier

[57] ABSTRACT

A servo valve device in a power steering apparatus of an automobile includes a valve housing having a main valve rotatably mounted therein for rotating in response to the movement of a hydraulic power cylinder. A flap valve member is rotatably mounted in the main valve member for controlling the supply of fluid under pressure to a pair of distribution ports from a pair of injection ports. Each of the distribution ports separately communicates with a different one of the pair of injection ports through a pair of fluid passages formed in the main valve. One of the fluid passages is connected to one chamber of the hydraulic power cylinder through an annular recess formed on the peripheral portion of the main valve member, while the other of the fluid passages is connected to the other chamber of the hydraulic power cylinder through a passage formed within the flap valve.

11 Claims, 3 Drawing Figures

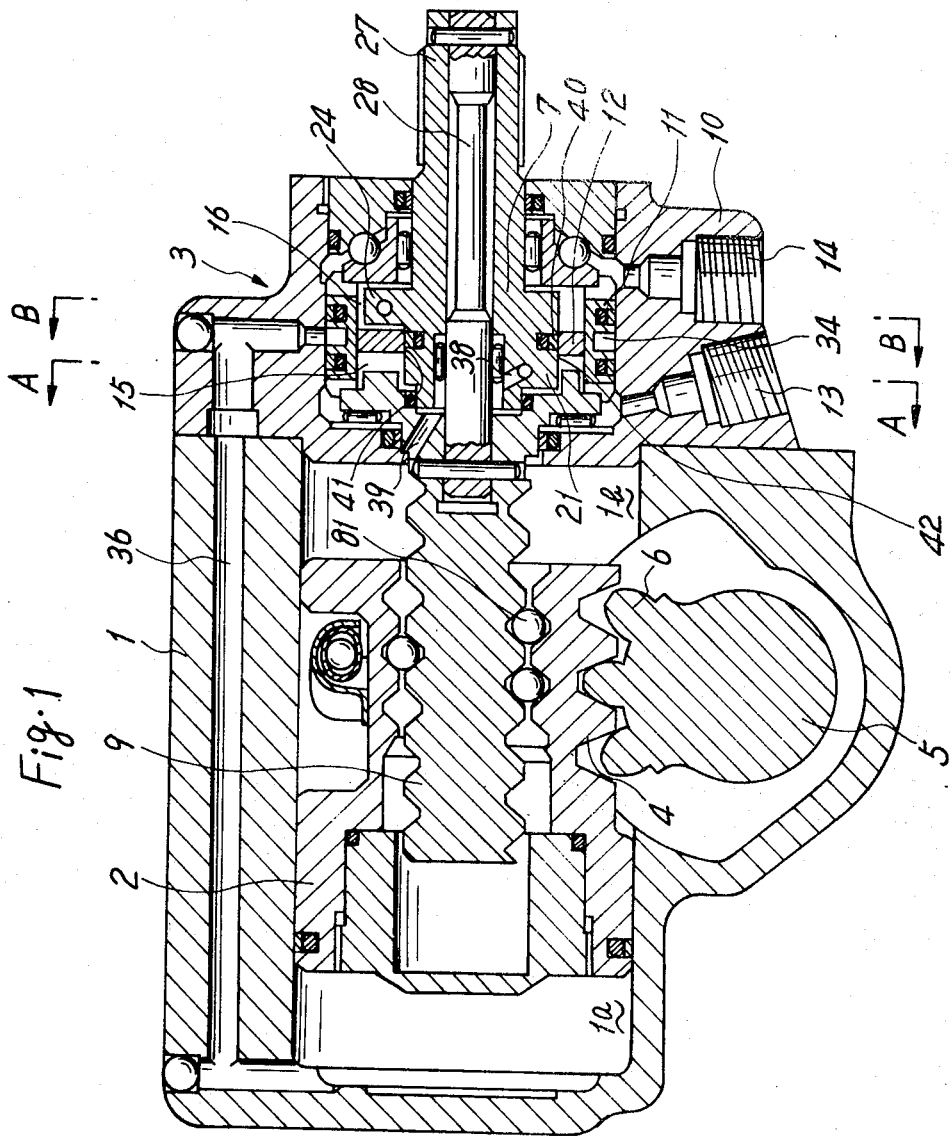

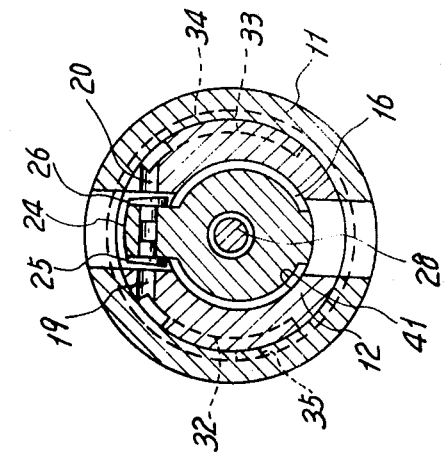
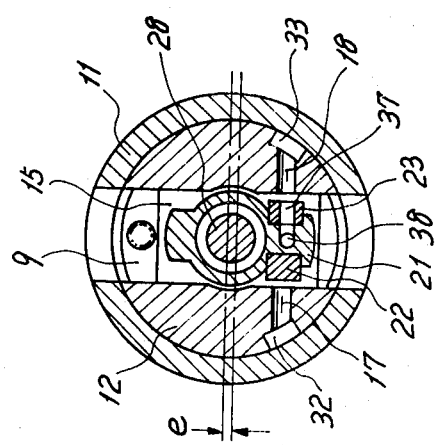

SERVO VALVE DEVICE IN POWER STEERING APPARATUS

BACKGROUND OF THE INVENTION

1. Field of the Invention:

The present invention relates generally to a power steering apparatus used in an automobile and more particularly to a servo valve device for controlling a fluid pressure motor in the power steering apparatus.

2. Description of the Prior Art:

In a heretofore known device of the type characterized herein, a nozzle-flap type servo valve is composed of a main valve member being rotatable in a valve housing, two valve chambers axially spaced in the main valve member and being sealed from each other, and first and second flap valves disposed respectively in the valve chambers and being rotatable with regard to the main valve member for controlling a stream resistance at distribution ports and injection ports, with the first and second flap valves being connected through a torsion-bar extending therebetween to a steering wheel and an output of the hydraulic motor.

Since the servo valves of the prior art have a plurality of annular recesses on the peripheral portion of the main valve member for providing communication between the conduits in the main valve to both chambers of the hydraulic motor, it is not enough to make the servo valve small in size. Since a plurality of seal elements are used, a frictional resistance caused thereby is comparatively large, thereby lowering the efficiency in rotation.

A power steering device with a servo valve, especially with a flap valve type servo valve, is generally characterized by a high response so that it turns or rotates with a high degree of sensitivity, and instantaneously, in response with a slight relative phase difference in the flap valve mechanism. However, since the sensitivity of the flap valve mechanism is sufficiently great to rapidly elevate the pressure in the fluid circuit upon an actuation thereof, vibration is created in the flap valve mechanism, thereby to unstabilize the characteristic for controlling fluid in the circuit and thereby to cause an operator to feel or sense the same as an unpleasant vibration.

SUMMARY OF THE INVENTION

Accordingly, it is therefore an object of the present invention to provide an improved power steering apparatus.

It is another object of this invention to provide a power steering apparatus having improved characteristics in a servo valve and designed, as a whole, to be small in size.

It is another object of this invention to provide a flap valve having stable characteristics by adding a vibration reducing operation in the flap valve so as to give a good steering feeling to a driver.

The foregoing objects, and others as well, are attained, according to the present invention, through the provision of a power steering apparatus which comprises a main valve member being rotatably mounted within a valve housing, a flap valve member rotatably mounted in the main valve member for controlling fluid under pressure to a pair of distribution ports being supplied from a pair of injection ports, each of which ports faces the flap valve member, a first fluid passage being formed within the main valve member and on a peripheral portion thereof for providing communication between one of the distribution ports and one of the injection ports and with one of the chambers of a hydraulic power cylinder. A second fluid passage is formed in the main valve member for providing communication between the other of the distribution ports and the other of the injection ports, and a third fluid passage is formed within the flap valve member for connecting the other of the distribution ports with the other of the chambers of the hydraulic power cylinder.

Furthermore, according to the present invention, a cylindrical portion of the flap valve member is rotatably eccentrically mounted in the main valve member, in a slight degree of eccentricity to the rotational axis of the steering shaft, whereby a frictional force for reducing the vibration therein is provided in proportion to the relative amount of rotation of the flap valves.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 1 is a sectional elevational view of a power steering apparatus according to the present invention;

FIG. 2 is a cross-sectional view of the apparatus shown in FIG. 1, taken along the line A-A thereof; and FIG. 3 is a cross-sectional view of the apparatus shown in FIG. 1, taken along the line B-B thereof.

DETAILED DESCRIPTION OF THE PREFERRED EMBODIMENT

Referring now to the drawings, wherein like reference characters refer to identical or corresponding parts throughout the several views, and more particularly to FIG. 1, there is shown one example of a power steering apparatus formed according to the present invention in which a valve housing 10 rotatably mounting a servo-valve device 3 therein is secured to a hydraulic cylinder 1 slidably containing a piston 2. Hydraulic chambers 1a and 1b are formed within cylinder 1 on opposing sides of the piston 2. A rack 4 formed on the piston 2 is meshed with a sector gear 6 provided on a cross shaft 5 which, in turn, is connected through a link mechanism, not shown, to dirigible wheels of a vehicle. Threadedly engaged with the piston 2 through balls 8 is a screw shaft 9, one end of which engages with one end surface of a main valve member 12 in non-rotatable relationship therewith. The main valve member 12 is tightly fitted to a sleeve valve member 11 mounted in the valve housing 10 and bodily moves therewith. As shown best in FIGS. 2 and 3, valve chambers 15 and 16 are formed on opposite sides of the main valve member 12, respectively communicating with inlet and outlet ports 13 and 14. A pair of distribution ports 17 and 18 and a pair of injection ports 19 and 20, which are formed in the main valve member 12, are respectively opened to the valve chambers 15 and 16 at both side walls thereof.

In the main valve member 12, there is formed an inner bore 41 which is eccentric to the rotational axis of a steering shaft by an eccentric amount e, as shown in FIG. 2. A control member, such as a flap valve member, 7 is rotatably mounted in the valve chambers 15 and 16 and extends through the eccentrical inner bore 41. The flap valve member 7 has first and second flap valves 21 and 24, which are located in the valve chambers 15 and 16, respectively, and radially extend in opposite directions from each other. At both sides of the first and second flap valves 21 and 24, there are formed valve seats 22, 23 and 25, 26, respectively, which cooperate with the pair of distribution ports 17 and 18 and the pair of injection ports 19 and 20. The radius of the first flap valve 21 is formed to be shorter than that of the second flap valve 24, so as to produce a proper steering reaction upon operation of the power steering apparatus.

On the flap valve member 7, between the first and second flap valves 21 and 24, there is formed a cylindrical portion 42, which is eccentric by a desired eccentric amount $e$, as shown in FIG. 2, to the rotational axis of the steering shaft and is in concentric relationship to the inner bore 41 when the flap valves are in a neutral position. At the peripheral portion of the cylindrical portion 42, an annular seal member 40 is mounted with a predetermined interference with the inner bore 41 of the main valve member 12 so as to prevent communication of fluid under pressure between the valve chambers 15 and 16.

Bodily formed on the flap valve member 7 is the steering shaft 27, which is rotatably journaled by bearings in the valve housing 10 and extends out of the valve housing 10. Mounted in inner bores of the screw shaft 9 and the steering shaft 27 is a torsion-bar 28, the ends of which are respectively connected with the end portion of the screw shaft 9 and the extending end of the steering shaft by pins.

The extending end portion of the steering shaft 27 is connected through suitable coupling members with a steering handle or wheel so as to be rotated or turned by a driver or operator of the vehicle.

Since the cylindrical portion 42 of the flap valve member 7 is eccentric to the rotational axis of the steering shaft 27, as previously mentioned, turning of the flap valve member 7 relative to the main valve member 12 serves to increase the amount of interference of the seal member 40 mounted between the cylindrical portion of the flap valve member 7 and the main valve member 12 to thereby increase the frictional resistance and thus prevent vibration of the flap valve member 7.

The fluid passage communication of the servo-valve device 3 with the hydraulic cylinder 1 is as follows. In the peripheral portion of the main valve member 12 engaged with the sleeve valve member 11, a pair of arcuate recesses 32 and 33, as shown in FIG. 3, are separately formed, respectively communicating the injection ports 19 and 20 with the distribution ports 17 and 18. In the peripheral portion of the sleeve valve member 11, an annular recess 34 is formed, being connected to the arcuate recess 32 through an axial passage 35 cut in the sleeve valve member 11. The annular recess 34 is connected with the left chamber 1a of the hydraulic cylinder 1 through a longitudinal passage 36 formed in the valve housing 10 and the hydraulic cylinder 1. On the other hand, a passage 37, facing the distribution port 18, is formed within the valve seat 23 of the first flap valve 21, as shown in FIG. 2, and is connected with the right chamber 1b of the hydraulic cylinder 1 through a fluid passage 38 formed in the first flap valve 21 and a passage 39 formed in one end of the screw shaft 9.

The inlet port 13 is connected with a fluid source, not shown, to supply fluid under pressure to the valve chamber 15, while the other valve chamber 16 is connected with the outlet port 14 to return fluid coming from the injection ports 19 and 20 to the fluid source.

Operation of the present embodiment is hereinafter described.

At a neutral position of the steering shaft 27, fluid under pressure in the valve chamber 15 supplied from the inlet port 13 streams into the distribution ports 17 and 18 and is discharged from the injection ports 19 and 20 to the outlet port 14 through the valve chamber 16. Since fluid pressure produced in the left and right chambers 1a and 1b of the hydraulic cylinder is balanced at the neutral position, the piston 2 remains unmoved.

When the steering shaft 27 is turned clockwise, as viewed in FIG. 2, the torsion bar 28 is twisted because of the resistance force between the steered wheels and the road which acts on the screw shaft 9, whereby the steering shaft 27 is turned in a clockwise direction relative to the main valve member 12. Accordingly, the first and second flap valves 21 and 24 are turned clockwise, as viewed in FIGS. 2 and 3, and tend to close the distribution port 17 and the injection port 20. Therefore, fluid under pressure in the valve chamber 15 is supplied to the injection port 20 through the distribution port 18 and the arcuate recess 33. However, since the stream discharged from the injection port 20 is restricted by the valve seat 26, the pressure in the fluid stream before the restriction is increased. Accordingly, fluid pressure is increased in the passage 37 in the valve seat 23, the fluid passage 38, the passage 39 and the right chamber 1b of the hydraulic cylinder 1 to move the piston 2 leftward, to thus make a right turn of the steered wheels. As mentioned before, since a small steering force of an operator is amplified, owing to the power of the hydraulic cylinder 1, the steered wheel can be easily and lightly deflected. In this operation, pressurized fluid acts on the valve seat 26 to turn the second flap valve 24 counterclockwise, to produce a steering reaction which acts to turn the steering shaft 27 in an opposite direction to the steering direction of the operator, and pressurized fluid also acts to turn the first flap valve 21 clockwise because of the differential pressure acting on the valve seats 22 and 23, it being remembered that high pressure fluid is present within passage or port 18 and acting upon valve seat member 23, while low pressure fluid is present within passage or port 17 as such is disconnected from chamber 15 by means of valve seat 22, and fluid already within passage or port 17 is connected to chamber 16 and outlet port 14 through means of open port 19 and passageway 32. Accordingly, an operator can feel a differential rotational movement as a steering reaction in response to the differential radius between the first and second flap valves 21 and 24.

Operation of the apparatus when the steering wheel is turned counterclockwise can be easily deduced and is not therefore described.

In this embodiment, the sleeve valve member 11 is formed separately from the main valve member 12. However, even if the sleeve valve member 11 is formed unitarily with the main valve member 12, the objects of the present invention are achieved successfully. In this case, the annular recess 34 may be formed on the peripheral portion of the main valve member 12 and the passages communicating the distribution ports 17 and 18 and the injection ports 19 and 20 may be formed within the main valve member 12.

Obviously, many modifications and variations of the present invention are possible in light of these teachings. It is therefore to be understood that within the scope of the appended claims, the invention may be practiced otherwise than as specifically described herein.

What is claimed as new and intended to be covered by Letters Patent is:

1. In a power steering device having a hydraulic power cylinder containing a piston slidable therein, having cylinder chambers at both sides thereof and a screw shaft so as to actuate steered wheels and a servo valve means serving to distribute fluid under pressure to said hydraulic power cylinder in response to the movement of a steering wheel, said servo valve means comprising:
    a valve housing;
    a main valve member rotatably mounted in said valve housing for rotating in response to the movement of said hydraulic power cylinder;
    a control member rotatably mounted in said main valve member for controlling fluid under pressure to a pair of distribution ports and from a pair of injection ports, each of which ports is formed in said main valve member and faces said control member;
    a first fluid passage formed within said main valve member and on a peripheral portion thereof for communicating one of said distribution ports with one of said injection ports and with one of the chambers of said hydraulic power cylinder;
    a second fluid passage formed in said main valve member for communicating the other of said distribution ports with the other of said injection ports; and
    a third fluid passage formed within said control member and one end of said screw shaft extending through the cylinder wall adjacent to said control member for connecting said other of said distribution ports with the other of the chambers of said hydraulic power cylinder.

2. A power steering device according to claim 1, wherein said control member has a cylindrical portion eccentric to the rotational axis thereof and a flexible member mounted thereon being cooperable with said main valve member.

3. A power steering device according to claim 1, wherein:
    said main valve member has a bore eccentric to the rotational axis thereof;
    said control member has a cylindrical portion eccentric to the rotational axis thereof which is in concentric relationship to said eccentric bore when said control member is in a neutral position; and
    a flexible member is mounted on said eccentric cylindrical portion for cooperating with said eccentric bore.

4. A power steering device according to claim 3, wherein:
    said main valve member has fluid chambers at both sides thereof for distributing fluid under pressure to said distribution ports and for receiving fluid from said injection ports; and
    said flexible member is a sealing member for separating said fluid chambers.

5. A power steering device according to claim 1, wherein said control member is a flap valve.

6. A power steering device according to claim 5, wherein:
    said flap valve has first and second arms extending radially in opposite directions;
    said first arm controls fluid under pressure going into said distribution ports; and
    said second arm controls fluid coming out from said injection ports.

7. A power steering device according to claim 6, wherein the radius of said first arm is formed to be shorter than that of said second arm, thereby to produce a steering reaction upon an operation of the power steering device.

8. A power steering device according to claim 6, wherein:
    said first and second arms have respective valve seats at both sides thereof; and
    said third fluid passage extends through one of said valve seats mounted on said first arm.

9. A power steering device according to claim 6, wherein said first and second arms are respectively located in fluid chambers formed at both sides of said main valve member.

10. A power steering device according to claim 9, wherein:
    said flap valve has a cylindrical portion which is eccentric to the rotational axis thereof and is positioned between said first and second arms; and
    said cylindrical portion has a sealing member thereon.

11. A power steering device comprising:
    a hydraulic power cylinder containing a piston slidable therein, having cylinder chambers at both sides thereof and a screw shaft so as to actuate steered wheels; and
    a servo valve means serving to distribute fluid under pressure to said hydraulic power cylinder in response to the movement of a steering wheel; said servo valve means comprising:
    a valve housing;
    a main valve member rotatably mounted in said valve housing for rotating in response to the movement of said hydraulic power cylinder;
    a flap valve member rotatably mounted in said main valve for controlling fluid under pressure to a pair of distribution ports and from a pair of injection ports, each of which ports is formed in said main valve member and faces said flap valve member;
    said flap valve member being connected to said screw shaft by a torsion-bar such that a relative rotation therebetween is allowed;
    a first fluid passage formed within said main valve member and in a peripheral portion thereof for communicating one of said distribution ports with one of said injection ports and with one chamber of said hydraulic power cylinder;
    a second fluid passage formed in said main valve member for communicating the other of said distribution ports with the other of said injection ports; and
    a third fluid passage formed within said flap valve member and one end of said screw shaft extending through the cylinder wall adjacent to said flap valve member for connecting the other of said distribution ports with the other chamber of said hydraulic power cylinder.

* * * * *